United States Patent [19]

Anderson et al.

[11] 4,321,318
[45] Mar. 23, 1982

[54] DISAZO PHOTOCONDUCTOR AND PROCESS OF MANUFACTURE OF ELECTROPHOTOGRAPHIC ELEMENT

[75] Inventors: Howard W. Anderson; Ronald H. Levin, both of Boulder, Colo.

[73] Assignee: International Business Machines Corporation, Armonk, N.Y.

[21] Appl. No.: 219,769

[22] Filed: Dec. 23, 1980

[51] Int. Cl.$^3$ .............................................. G03G 5/06
[52] U.S. Cl. .......................................... 430/59; 430/72; 430/133; 260/160
[58] Field of Search ...................... 430/72, 133, 73, 58, 430/59; 260/160

[56] References Cited

U.S. PATENT DOCUMENTS

| | | | |
|---|---|---|---|
| 3,898,084 | 8/1975 | Champ et al. | 430/72 |
| 4,052,210 | 10/1977 | Hectors | 430/72 |
| 4,123,270 | 10/1978 | Heil et al. | 430/72 |
| 4,150,987 | 4/1979 | Anderson et al. | 430/59 |
| 4,286,040 | 8/1981 | Van Lomm | 430/72 X |

FOREIGN PATENT DOCUMENTS 2260540  7/1973  Fed. Rep. of Germany .

*Primary Examiner*—Roland E. Martin, Jr.

*Attorney, Agent, or Firm*—Francis A. Sirr

[57] ABSTRACT

A layered xerographic photoconductor having a charge generating layer which includes a photosensitive dye molecule which is soluble in chlorinated organic solvents, specifically methylene chloride, the dye molecule being

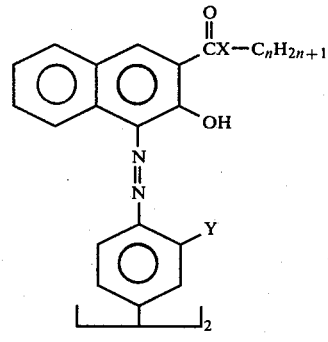

$X = O, NH$
$n \geq 12$
$Y = H, Cl, OMe$ and a P-type charge transport layer.

8 Claims, No Drawings

DISAZO PHOTOCONDUCTOR AND PROCESS OF MANUFACTURE OF ELECTROPHOTOGRAPHIC ELEMENT

TECHNICAL FIELD

This invention pertains to electrophotographic reproduction, and particularly to photoconductive materials used in electrophotographic reproduction.

BACKGROUND OF THE INVENTION

In the art of electrophotography, an electrophotographic imaging element or photoconductor, containing a photoconductive layer, is uniformly electrostatically charged, and then exposed to a pattern of activating actinic radiation, such as visible light. This radiation liberates holes and electrons within the photoconductor, causing the photoconductor to be conductive only in those areas which are irradiated. Thus, the charge is selectively dissipated in the irradiated areas, leaving a charge representing a latent electrostatic image in the non-irradiated areas. This latent electrostatic image is then developed to form a visible image by, for example, depositing finely divided electroscopic toner particles on the surface of the electrophotographic imaging element. These toner particles carry a charge of a selected polarity so that the toner is selectively attracted only to the charged areas of the latent image.

In practice the electrophotographic imaging element may comprise a homogeneous photoconductor layer on a support, or alternatively it may comprise a multilayered structure including a layer of charge generating photoconductive material as well as a layer of charge transport material.

A well known multi-layer electrophotographic photoconductor utilizes a flexible, aluminum-metallized substrate, of for example biaxially oriented polyethylene terephthalate (Mylar by E. I. du Pont de Nemours & Co.) of 3 mil thickness. A charge generating layer is deposited on the substrate's conductive side. This charge generating layer is typically between 0.05 micron and 0.20 micron thick. The charge generating layer is coated onto the substrate utilizing, for example, meniscus coating, doctor blade coating or dip coating, as is well known to those skilled in the art. Preferably, an adhesive layer, such as a polyester resin, is provided on the substrate's conductive side to aid in bonding the charge generation layer thereto.

In order to complete this multi-layer photoconductor, a charge transport layer of 5 to 35 micron thickness is coated on top of the charge generating layer.

The present invention relates to the composition of a charge generating layer as generally described above.

U.S. Pat. No. 4,123,270, incorporated herein by reference, describes an organic charge generating layer of the aforementioned general type, wherein the layer is formed from a coating solution of a disazo compound, more specifically an organic dye material comprised primarily of an organic dye material selected from organic primary amine soluble charge generating monoazo and disazo compounds and from organic primary amine soluble charge generating derivatives of squaric acid. U.S. Pat. No. 3,898,084, incorporated herein by reference, also describes a dispersion of photoconductive material which is coated to form a charge generating layer.

In both of these patents, the superior electrophotographic performance of the dye molecule chlorodiane blue (CDB) is described.

THE INVENTION

While the above-mentioned patents are entirely satisfactory in their electrophotographic performance, both suffer from manufacturing limitations. U.S. Pat. No. 4,123,270 requires the use of hazardous amine solvents, of which ethylenediamine and butylamine are exemplary, to coat the charge generating layer. U.S. Pat. No. 3,898,084 requires time consuming grinding and milling of the pigment in a batch process to prepare the charge generating layer.

Although manufacturing procedures exist which allow safe use of amine solvents, it is highly desirable to use less toxic solvents. The present invention accomplishes this result.

The present invention provides a modified CDB-like dye which is soluble in chlorinated solvents, of which methylene chloride is preferred. Synthesis of the dye molecule of the present invention can be accomplished as is well known to those of skill in the art. The general method of synthesizing CDB as described in aforementioned U.S. pat. No. 3,898,084 is exemplary.

In its broadest aspect, the dye molecule of the present invention is represented as

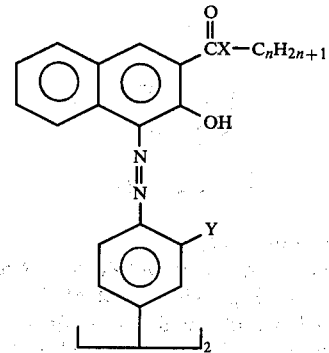

where $X = O, NH$; $n \geq 12$ and $Y = H, Cl, OMe$.

The preferred dye molecule of the present invention is the bis-n-octadecyl ester of 3,3'-dichloro-4,4'-diphenyl bis-(1''-azo-2''-hydroxy-3''-naphthoic acid), and is represented as

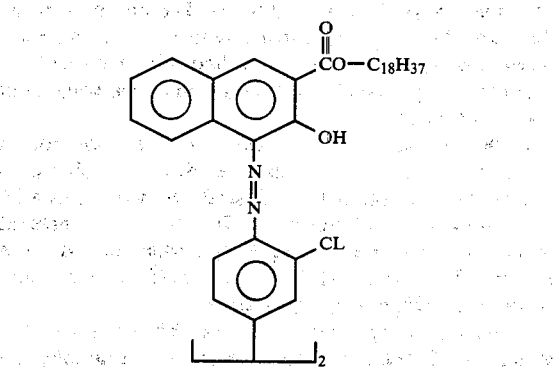

The preferred synthesis of this molecule is as follows:
This synthesis is in essence the reaction of two equivalents of n-octadecanol($C_{18}H_{37}OH$, molecular weight 270.5) and 3,3'-dichloro-4,4'-diphenyl bis-(1''-azo-2''-hydroxy-3''-naphthoic acid)

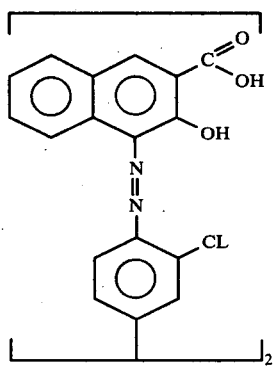

(molecular weight 651), to form the dye pictured below.

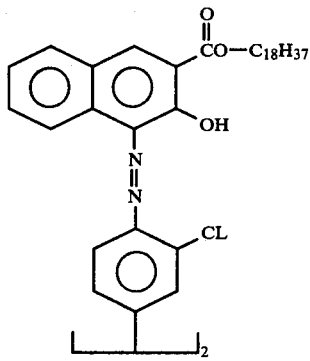

(molecular weight 1155).

More specifically, 500 ml of toluene, 0.6 ml dimethyl formamide and 13 g (0.02 mole) of the bis-acid are placed into a 1,000 ml round-bottom flask. Three ml of thionyl chloride is then added, and the reaction is heated at 65°C. for five hours. At the end of this time, 10.8 g (0.04 mole) of octadecanol in 100 ml of hot toluene is dripped into the still hot reaction flask over a 15 minute period. When this addition has been completed, the flask's contents are maintained at 65°C. for one hour. At this time, 200 ml of water are added and the reaction is stirred for five minutes. The contents of the flask are then filtered, slurried with acetone and refiltered. The solid dye is then washed with acetone until the filtrate is pale pink and then given a final wash with 200 ml of ether.

In the practice of the present invention a solution of the dye molecule, synthesized as described above, is coated onto a conductive substrate to yield a charge generating layer of the dye. The dye of the present invention is essentially completely dissolved, and is not present as particles when being coated onto the substrate as a charge generating layer.

In the following example A of the present invention, as well as in the following comparative example, the described charge generating layer is overcoated with a P-type charge transport layer of the type described in U.S. pat. No. 4,150,987, incorporated herein by reference.

COMPARATIVE EXAMPLE

A conventional CDB charge generating layer was prepared by coating an aluminized Mylar (du Pont Trademark for polyethylene terephthalate) substrate with a solution of polyester resin (PE 200 available from Goodyear) in tetrahydrofuran:toluene solvent system in a 9:1 ratio (0.7% to 1.4% solids, weight:weight). The polyester coating was meniscus coated and dried in a forced air oven.

CDB (0.73% solids by weight) was then dissolved in 1.2:1.0:2.2 (by weight) mixture of ethylenediamine, n-butylamine and tetrahydrofuran. Silicone oil (available under the Trademark DC-200 from Dow Corning) was then added in the amount of 2.3% by weight relative to the CDB. The resulting solution was meniscus coated onto the polyester coated substrate, and the resulting coated substrate dried in a forced air oven. Thus a relatively conventional CDB charge generation layer was produced on a conventional polyester support.

A charge transport layer in accordance with U.S. pat. No. 4,150,987 was formed by admixing a polycarbonate resin binder (M-60 available from Mobay Chemical Company) in the amount of 7.65 grams, a polyester resin (PE-200 available from Goodyear) in the amount of 3.60 grams, and an acrylic resin (A-11 available from Rohm and Haas) in the amount of 2.25 grams in 86.5 grams of tetrahydrofuran and toluene solvent, the solvents being present in a ratio of approximately 9:1 by weight. The hydrazone p-diethylaminobenzaldehyde-(diphenylhydrazone) was then added in the amount of 9.0 grams in conjunction with 0.02 grams of silicon oil (DC-200). Additional tetrahydrofuran was then added to adjust the viscosity to that appropriate for the chosen coating technique. The resulting solution was meniscus coated onto the charge generation layer as formed above and the entire film again dried in a forced air oven to form a finished multilayered electrophotographic element.

The electrophotographic element of this comparative example was tested by first charging the surface thereof to −870 volts in the dark, exposing the charged electrophotographic element to light typical of that utilized in a commercial electrophotographic apparatus under various light intensity conditions, and determining the light intensity necessary to discharge the element to a voltage of −150 volts after 454 milliseconds under such conditions. It was determined that the element of this comparative example required 1.3 microjoules per square centimeter for such discharge.

EXAMPLE A

The Mylar support substrate of the comparative example was again coated with the described polyester resin and dried in a forced air oven.

The charge generation solution was prepared by dissolving 1.5 gm of the dye molecule of the present invention in 150 ml of methylene chloride and stirring for 15 minutes. The solution was then pressure filtered through a disc of Whatman #2 filter paper. To this dye solution is added one drop of silicone oil (available under the trademark DC-200 from Dow Corning).

The resulting solution was meniscus coated onto the polyester coated substrate and then dried in a forced air oven. Thus, a charge generation layer in accordance with the present invention was produced on a conventional polyester support.

A charge transport layer in accordance with U.S. Pat. No. 4,150,987, and as used in the above comparative example, was formed as above described and meniscus coated onto the charge generation layer of the present invention. The entire film was again dried in a forced air oven, to form a finished multilayer electrophotographic element.

This electrophotographic element was tested in a similar manner as described for the comparative example. In this case, a light intensity of 4.00 microjoules per square centimeter discharged the element from −500 volts to −115 volts.

This photosensitivity is more than sufficient to function as a viable electrophotographic imaging element.

While the invention has been particularly shown and described with reference to preferred embodiments thereof, it will be understood by those skilled in the art that various changes in form and details may be made therein without departing from the spirit and scope of the invention.

What is claimed is:

1. A layered xerographic photoconductor having a charge generating layer containing a photosensitive dye molecule which is soluble in a chlorinated organic solvent, the dye molecule being

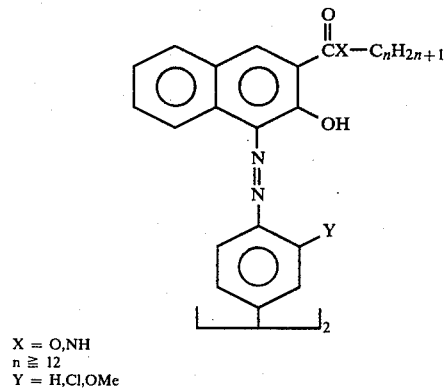

X = O,NH
n ≧ 12
Y = H,Cl,OMe and a P-type transport layer.

2. The photoconductor of claim 1 wherein said solvent is methylene chloride.

3. The photoconductor of claim 1 or 2 where the dye molecule has n = 18, X = O and Y = Cl.

4. The photoconductor of claim 1 or 2 where the dye molecule has n = 18, X = O and Y = Cl, and where the transport layer contains p-diethyl amino benzaldehyde-(diphenyl hydrazone).

5. The process of manufacturing an electrophotographic imaging element including an electrically conductive substrate, comprising the steps of:

essentially completely dissolving the dye molecule

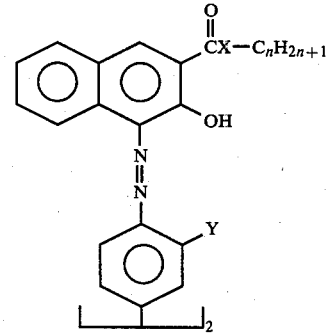

X = O,NH
n ≧ 12
Y = H,Cl,OMe in a chlorinated solvent;

then coating the resulting solution onto a polyester coated conductive substrate; and then coating the dye layer with a P-type transport layer.

6. The process of claim 5 wherein said solvent is methylene chloride.

7. The process of claim 5 or 6 wherein the dye molecule has n = 18, X = O, and Y = Cl.

8. The process of claim 5 or 6 wherein the dye molecule has n = 18, X = O, and Y = Cl, and where the P-type transport layer contains p-diethylaminobenzaldehyde-(diphenylhydrazone).

* * * * *